United States Patent Office 3,176,003
Patented Mar. 30, 1965

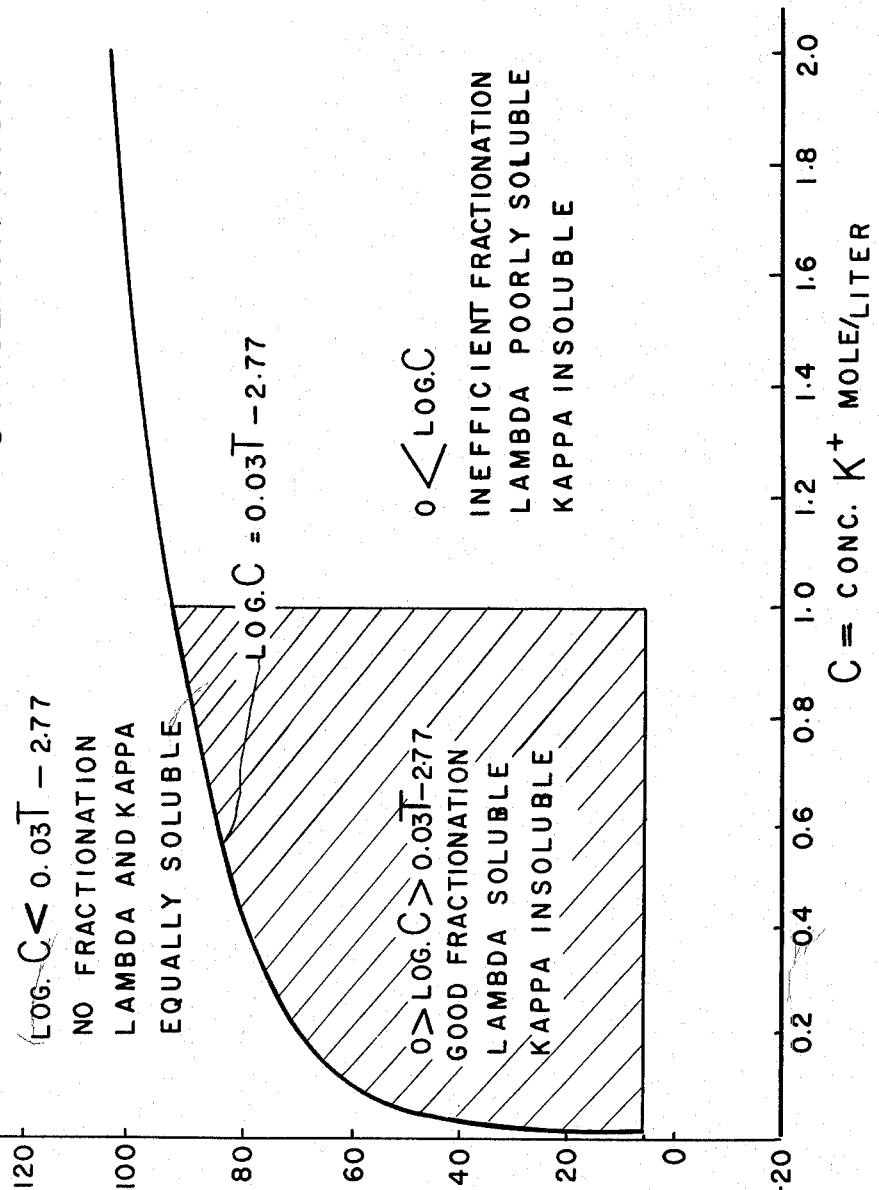
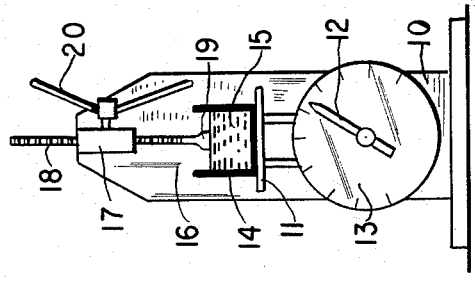

3,176,003
SELECTIVE EXTRACTION OF HYDROCOLLOID FRACTIONS FROM SEA PLANTS
Dimitri J. Stancioff, Rockport, Maine, assignor to Marine Colloids Inc., New York, N.Y., a corporation of Delaware
Filed Aug. 15, 1961, Ser. No. 131,649
15 Claims. (Cl. 260—209)

This invention relates to the selective extraction of hydrocolloid fractions from natural materials containing components which are, respectively, soluble and insoluble in the presence of certain electrolytes. Examples of such materials are the carrageenan-containing sea plants of the order Gigartinales.

Carrageenan is a sulfated polysaccharide hydrocolloid, the major element of the ground substance in these red sea plants. The carrageenans as normally extracted by current commercial processes have been shown to be composed of two major components which have been designated as kappa-carrageenan and lambda-carrageenan. Major composition differences of the two fractions are that the lambda component contains a higher percentage of ester sulfate than does the kappa component, while the kappa component contains a large proportion of anhydro-sugar moieties, whereas these are practically non-existent in the lambda component. A major physical difference lies in the ability of certain salts such as those of potassium, ammonium, rubidium, cesium, calcium, barium, strontium and magnesium, and particularly potassium salts, to induce the gelation or precipitation of sols of kappa-carrageenan, whereas lambda-carrageenan is substantially devoid of any ability to form gels or to precipitate under these conditions. The chemical and structural differences have been reported in the following published articles D. B. Smith, W. H. Cook, Arch. Biochem. and Biophys. 45, 232–3 (1953).
D. B. Smith, W. H. Cook, and J. L. Neal, Arch. Biochem. and Biophys. 53, 192–204 (1954).
D. B. Smith, A. N. O'Neill, A. S. Perlin, Can. J. Chem. 33, 1352–60 (1955).
A. N. O'Neill, J. Am. Chem. Soc. 77, 6324–6 (1955).
S. T. Bayley, Biochim. et Biophys Acta 17, 194–205 (1955).
D. A. I. Goring, E. G. Young, Can. J. Chem. 33, 480–95 (1955).

For the purpose of this invention the term "kappa fraction" is used to designate that portion of the hydrocolloid which is precipitable by or insoluble in the presence of potassium cations; the lambda fraction is defined as that portion of the hydrocolloid which is soluble in and is not precipitated by the presence of potassium cations.

The current industrial procedure for obtaining carrageenan from sea plants is to extract with water near boiling temperature until essentially all the carrageenan is in solution, and then to remove the insoluble matter by filtration. The carrageenan is recovered from the clarified extract by precipitation with a hydrophilic alcohol or by evaporation of the water on drum driers. In such a process the lambda and kappa components are extracted together from the sea plants and are recovered with no attempt at separation. There is an advantage to the recovery of the separate fractions in that they differ in physical properties other than the distinguishing one of gelation mentioned above. For example, only the lambda fraction has the property of suspending chocolate particles in cold process chocolate milk and only the kappa fraction has the property of conveying desirable rigidity to milk puddings. Therefore, fractionation of the extractive allows one to prepare material of greater potency in each of the desired properties and to eliminate disturbing side-effects from those undesired properties associated with the other component. For instance, there are many applications where the rheological properties of the lambda component are desired without the complicating gelation of the kappa component and there are other instances where the gel structure obtained with the kappa component is desired without the complicating viscosity of the lambda component. The value in obtaining separate carrageenan components has been recognized in the issuance of Canadian Patent No. 561,448 (issued August 5, 1958) to David B. Smith on a procedure for "Fractionation of Certain Geloses." The method of fractionation according to Smith's invention comprises treating a carrageenan sol with a salt of a cation selected from the group ammonium, potassium, rubidium and cesium, whereby a precipitate of the kappa component is formed, and separating the precipitate by centrifugation or decantation. This procedure is applicable only to sols of carrageenan and requires that the mixture of both fractions of carrageenan first be extracted from the sea plants before the fractions can be separated and recovered.

I have now discovered a process which makes it unnecessary to extract both components of the carrageenan from the sea plants prior to their separation. I have found that by soaking the sea plants in a solution of one or more compounds selected from the group consisting of the salts and hydroxides of the cations of ammonium, potassium, rubidium, cesium, calcium, barium, strontium, and magnesium, under certain conditions of temperature and solute concentration, I can selectively extract the lambda fraction from the sea plants while the kappa fraction essentially remains in the plant structure. The extract containing the lambda component can be drained from the residual plant material which can then be processed by conventional methods to recover the kappa fraction. By utilizing the same technique it is possible to extract the lambda component from commercial carrageenan extractives by soaking the extractive powder in a solution containing one or more of the above-mentioned electrolytes, and separating the resulting extract containing the lambda component from the kappa component which remains undissolved.

Under industrial conditions usually employed for extracting carrageenan the kappa and the lambda fractions are about equally soluble and are extracted from the sea plant at substantially equal rates and in substantially the same proportions as those in which they exist in the sea plant, regardless of temperature. The temperature of extraction under these conditions influences only the rate and degree of extraction by inducing swelling and breakdown of the plant tissues which enclose the carrageenan and by increasing the rate of diffusion of the carrageenan into the solution. Other means for controlling swelling and extraction such as the use of hydroxyl ions also affect both fractions equally so that extraction under these conditions is not selective. Because of the equal solubility of both fractions in commonly practiced methods of extraction it is obviously impossible to obtain any selectivity of extraction of the lambda fraction over the kappa fraction by simply varying the temperature. However, if at a given temperature a sufficient quantity of a compound selected from the group consisting of salts and hydroxides of the cations ammonium, potassium, rubidium, cesium, calcium, barium, strontium and magnesium is dissolved in the water used for extraction, the kappa fraction of the carrageenan is prevented from being extracted, whereas the lambda fraction remains substantially unaffected in its solubility and readily dissolves in the extraction solution. The concentration of the abovementioned compounds of specific cations necessary to obtain the desired difference in solubility between the kappa and the lambda components is closely related to the temperature of extraction. Accordingly, in the practice of this invention the extraction is carried out in the presence of the aforesaid cations, an amount of the compound or compounds being employed that provides a cation concentration at which the lambda component is soluble at the temperature employed and a substantial proportion of it goes into solution, whereas under these same conditions the kappa component is substantially less soluble and, therefore, a substantial proportion of it is prevented from going into solution.

At any given temperature there is a minimum concentration of the compounds of specific cations below which the kappa and the lambda fractions are about equally soluble and dissolve simultaneously. Above this minimum concentration the kappa fraction is substantially insoluble whereas the lambda fraction is soluble. The temperature and concentration conditions which must be met, in order to obtain selective solution of the lambda fraction in the presence of added potassium salts and potassium hydroxide, can be expressed approximately by the relationship:

$$0 > \log C > 0.03T - 2.77$$

where $C$ is the concentration of potassium ions in moles per liter of extracting solution and $T$ is the temperature in degrees centigrade. These conditions are depicted graphically in FIG. 1.

It follows that for the practice of my invention utilizing compounds containing the potassium ion the temperature and potassium ion concentration must be in accordance with the above-expressed relationship, because then the kappa fraction of the carrageenan is substantially insoluble and is selectively retained in the sea plants, whereas the lambda fraction remains soluble and a substantial portion thereof goes into solution and can be separated from the said insoluble kappa fraction.

My process for selective extraction is impractical at potassium ion concentrations greater than 1 molar, where $\log C > 0$, because the solubility of the lambda fraction begins to be repressed by the high ionic strength of the solution and the rate of extraction of the lambda fraction becomes very slow. At the other extreme when $$\log C < 0.03T - 2.77$$

the kappa fraction, becomes substantially soluble and is extracted along with the lambda fraction and no selective extraction is possible. It should be noted that in the limiting case where $\log C = 0.03T - 2.77$ this expression closely expresses the relationship existing between the melting temperature of a water gel of kappa carrageenan and the potassium ion concentration.

At a given temperature, the concentration of any of the aforesaid cations other than potassium for providing effectiveness which is the equivalent of that afforded by a given concentration of the potassium cation differs somewhat from that of the potassium cation. The same applies to mixtures of two or more of the aforesaid cations.

Accordingly, with general reference to the aforesaid cations and mixtures thereof, the cation concentrations at a given temperature should be within the range that is effectively equivalent to that of potassium as defined by the aforesaid relationship. The temperature at which the selective extraction may be carried out may range between the approximate limits 5° C. and 90° C.

It is a further feature of this invention that by controlling the swelling of the sea plants or extractives the rate and extent of selective extraction of the lambda portion can be varied. The degree of swelling should be such that the lambda component will diffuse as rapidly as possible but must be limited to below that point where physical separation of the swollen particles of residual material from the extracted lambda component is impaired.

The factors determining the swelling of carrageenan either as it exists in sea plants or as the recovered extractive, are water temperature, salt concentration and also, when the extraction is carried out on the sea plant, the hydroxyl ion concentration. It should be noted, however, that the factors affecting swelling are distinct from the abovementioned factors of specific cation concentration which determine the selective extraction of the lambda over the kappa fraction.

The presence of hydroxyl ions, I have discovered, greatly facilitates extraction from the whole sea plant. The function of the hydroxyl ions seemingly is to produce a swelling of the sea plant and a dissociation of the carrageenan from the complex in which it exists in situ, whereby diffusion of the soluble component into the extraction medium is promoted. Regardless of the actual mechanism involved, it is the case that extraction is aided by increasing the hydroxyl ion concentration, though not to the point where the type and concentration of ions in the extraction medium exceeds that at which the lambda component becomes insoluble. The desired hydroxyl ion concentration may advantageously be obtained by use of an alkaline compound which also supplies the specific cation required for the selective repression of the solubility of the kappa component, an example of such a compound being potassium hydroxide. Use of such a compound, however, is not essential to the practice of my invention, and any other alkaline compound or compounds which will afford the requisite concentration of hydroxyl ions may be employed.

The concentration of hydroxyl ion employed is not critical. For best results it should be in the concentration range of about 0.025 to about 0.2 mole per liter of extracting solution, as shown in the examples. With insufficient concentration of hydroxyl ion, most sea plants do not swell sufficiently to permit maximum extraction. When the concentration of hydroxyl ion is too high the extract may be damaged to the extent that some of its desired properties are lost. Also, an excess of hydroxide suppresses swelling by ionic strength effect. Any compound which supplies hydroxyl ions in sufficient quantity may be employed as long as the cation associated with the hydroxyl ion does not interfere in the selective extraction. Examples of compound that may be used are sodium hydroxide, potassium hydroxide, calcium hydroxide, ammonium hydroxide, the lower quaternary ammonium hydroxides and salts of strong bases with weak acids such as sodium and potassium carbonates, phosphates and borates.

When an hydroxyl concentration within the range about 0.025 to about 0.2 mole per liter is provided by an hydroxide of one of the aforesaid cations, e.g. potassium or calcium, the concomitant cation concentration is within the range that is effective in the practice of this invention.

For a number of commercial applications it is desirable that the carrageenan extractive contain both potassium and calcium cations, and in such case it is preferable to employ a solution containing a water-soluble potassium compound, preferably potassium chloride, and calcium hydroxide.

In selecting the best condition for extraction, advantage can be taken of the fact that selective solubility is sharp over a very wide range of temperature and specific cation concentration as long as the proper combination of these two factors is taken. It is, therefore, possible to choose the temperature and concentration conditions best suited to a given raw material for optimum rate of extraction and ease of separation. Accordingly, the preferred working conditions for the practice of my invention depends on the type of raw material being processed, the type of equipment available and the type of end product desired. When extracting selectively from the finished extractive powders a preferred temperature range is 10° to 30° C., otherwise the extractive swells excessively. For the same reason it is desirable to work with concentrations of soluble salt in the order of 1% to 3%. This salt may be a salt of the aforesaid cations or may be a salt of another cation, for example, sodium chloride, so long as the concentration of the aforesaid cations is within the range defined hereinabove and preferably in the upper portion of said range. When extracting directly from the sea plant the preferred temperature range is 20° to 50° C. at specific cation concentrations varying from 0.05 molar to 0.25 molar and in the presence of hydroxyl ions. Under these conditions the cellular material in the plant is swollen and breaks up readily, permitting the more complete release of the lambda fraction. However, should it be desired to extract more rapidly because practical conditions do not permit prolonged holding times, it is preferable to use temperatures from 50° to 80° C. in order to accelerate the diffusion of the lambda component into the solution.

In the practice of my invention as applied to the recovery of carrageenan fractions directly from whole sea plants, the sea plants are preferably prepared by washing them free of all surface and readily diffusible salts. They may be further prepared by comminution to expose cross sections of the fronds, but are not comminuted to the extent where separation of the extractive sol from the frond sections is severely impaired.

The following examples illustrate the practice of my invention as it is affected by the factors described above. It is to be understood that these examples are intended to illustrate, but not to limit, the scope of my invention.

EXAMPLE 1

An 80-gram sample of air dried *Chondrus crispus* of Nova Scotia origin was washed twice in 1.6 liters of water for 30 minutes at 20° C. The washed sample was transferred to 1.3 liters of a solution containing 9.6 grams of potassium hydroxide. The total weight of the mixture was brought to 1600 grams with water in order to bring the potassium hydroxide concentration to approximately 0.6% of the mixture (0.11 mole per liter). The resulting mixture was held at 40° C. for 48 hours with occasional agitation. The viscous extract which resulted from this treatment was drained from the residual sea plants, clarified by filtration and poured into 2 volumes of 85% by weight isopropyl alcohol, thus precipitating the carrageenan contained therein. The air-dried precipitate amounted to 6.3% by weight of the original sea plants. A solution consisting of 2.0% by weight of this precipitate, 1.0% of potassium chloride, and 97.0% water set to a soft gel, which at 10° C. had a breaking strength of 50 grams, when tested with a 21 mm. diameter plunger.

The sea plant residue was cooked in water at 90° C. for 2 hours to extract the remaining carrageenan. The resulting extract was clarified by filtration and recovered by precipitation in 2 volumes of 85% by weight isopropyl alcohol. A solution consisting of 2.0% by weight of dried precipitate obtained from the sea plant residue, 1.0% potassium chloride and 97.0% water set to a very stiff gel which at 10° C. had a breaking strength of more than 2000 grams when tested by the same procedure as above.

This example illustrates the practice of my invention as applied to the whole sea plant. It is evident that the material first extracted consists largely of the lambda or non-gelling fraction of the carrageenan in the sea plant and that the remaining extractive is highly enriched in the kappa or gelling fraction.

Gel strength is measured in terms of its breaking strength value, the breaking strength value given in this and other examples herein being determined in the following way. A 500-gram quantity of solution is made up so as to contain the prescribed percentages of the extractive to be tested and of potassium chloride. To this end the extractive and the potassium chloride are placed in a tared beaker with an amount of deionized water that is slightly less than the total amount required. The contents of the beaker are heated, using a boiling water bath and while subjecting the contents to vigorous agitation; the contents being heated to substantially 180° F. and maintained at this temperature for a period of 5 minutes. The solution is then adjusted to the final 500-gram weight and while it is still hot it is divided into three equal portions, each portion being placed in a 7 cm. diameter crystallizing dish that is 5.0 cm. deep which is placed in a water bath maintained at the prescribed testing temperature. Thereupon the dishes are removed from the water bath and the gelled content of each is removed and is replaced in its dish after having been inverted. Each dish containing its inverted gel is placed on the pan of the measuring device that is used for gradually forcing a plunger having the prescribed diameter against the upper surface of the gel with measured force until the force suddenly falls off at the moment of rupture of the gel, the maximum noted force being the breaking force. The breaking force for each of the three samples is noted and the average thereof is taken as the gel strength value for the tested extractive. While other types of measuring device may be employed, the device used in obtaining the breaking strength values given herein is illustrated in FIG. 2 of the accompanying drawing. A conventional spring scale 10 comprises the weighing pan 11 and the pointer 12 which indicates directly on the scale 13 the force applied to upper surface of the pan 11. The pan 11 is of such size as to support the crystallization dish 14 thereon that contains the inverted gel 15. Mounted on frame 16 there is the bracket 17 for holding the plunger 18 vertically disposed so that the head 19 may come to bear at the approximate center of the gel 15 in the dish 14. By turning the handle 20 the plunger 18 may be moved up or down through appropriate mechanism such as a rack and pinion. The head 19 desirably is detachable from the plunger 18 so that heads of different diameters may be used as prescribed. In use the plunger head is forced gradually against the surface of the gel 15 while noting the applied force as indicated by the pointer 12. When the gel ruptures the pointer snaps back and the applied force immediately prior to snapping back is noted as the breaking strength or gel strength of the gel.

EXAMPLE 2

Using the same general procedure described in Example 1, a series of samples of the same lot of *Chondrum crispus* was treated at potassium hydroxide concentrations varying from zero to 1.2% by weight of the mixture (0.22 mole per liter) and at temperatures ranging from 10° C. to 60° C.

The yields and gel strengths of the extractives selectively recovered from the sea plants by these treatments are shown in Table 1.

TABLE 1.—*Effect of variations in potassium hydroxide concentration on quantity and gelling properties of extractives*

| Conc. of Potassium Hydroxide | | Extraction Temperature (°C.) | | | | | | | | | | | |
|---|---|---|---|---|---|---|---|---|---|---|---|---|---|
| | | 10 | | 20 | | 30 | | 40 | | 50 | | 60 | |
| Percent of Mix | Moles per liter | Yield [1] | Gel [2] | Yield [1] | Gel [2] | Yield [1] | Gel [2] | Yield [1] | Gel [2] | Yield [1] | Gel [2] | Yield [1] | Gel [2] |
| 0.0 | 0.0 | 0.4 | 0 | 1.4 | 150 | 3.9 | 970 | ---- | ---- | ---- | ---- | ---- | ---- |
| 0.3 | 0.055 | 1.5 | 15 | 2.0 | 18 | 4.6 | 58 | 6.0 | 190 | ---- | ---- | ---- | ---- |
| 0.6 | 0.11 | ---- | ---- | 1.0 | 0 | 3.9 | 0 | 6.3 | 50 | 8.1 | 170 | ---- | ---- |
| 1.2 | 0.22 | ---- | ---- | ---- | ---- | ---- | ---- | 4.2 | 0 | 5.5 | 12 | 7.9 | 412 |

[1] Yield, as percent of original sea plant weight.
[2] Gel, breaking strength measured as described in Example 1.

It is obvious from the tabulated results that both the selectivity and the extent of the extraction of the non-gelling component of the hydrocolloid depends on the selection of the proper combination of temperature and potassium hydoxide concentration.

EXAMPLE 3

2-kilogram lot of air-dried *Chrondus crispus* of Nova Scotia origin was ground in a hammermill to pass a screen with quarter-inch diameter holes. Sand and dust finer than would pass a U.S. Standard 80-mesh sieve were removed, the lot divided into 80-gram portions and each portion washed for 30 minutes in 1.6 liters of water at 20° C. The samples were then soaked in solutions containing potassium hydoxide, potassium chloride or mixtures of both these electrolytes. The procedure for recovery of the selectively extracted product was essentially the same as described in Example 1. The method for determining gel strengths was also the same. The results are summarized in Table 2.

This example shows that selective extraction can be obtained by using either potassium hydroxide, potassium chloride or a combination of both electrolytes. The proper amounts of electrolyte needed are dictated by the temperature, a higher concentration being required at a higher temperature. On an equivalent weight basis potassium chloride is slightly more effective in preventing extraction of the gelling component of the hydrocolloid but it also reduces the yield of the non-gelling component particularly around 40° C.

For the same degree of selectivity the use of potassium hydroxide results in considerably higher yields, but at 60° C. the amount of potassium hydroxide required for selective extraction results in pH values well above 13. The condition of high pH together with high temperature is deleterious to extractive quality. At higher temperatures it is therefore advantageous to combine the properties of both potassium chloride and potassium hydroxide in order to obtain the maximum selectivity with good yield of high quality extractive.

EXAMPLE 4

A 5-kilogram lot of air-dried *Chrondus crispus* from Prince Edward Island was washed in 150 kilograms of cold tap water and drained. 2 kilograms of a 15% by weight potassium hydroxide solution were then added to the washed sea plants followed by water at a temperature of 40° C. until the total weight was 100 kilograms. The mixture was held for 60 hours with occasional agitation, during which time the temperature dropped to 24°–25° C. A 20-kilogram aliquot of the resulting mixture of sea plants and viscous solution was processed further, as described immediately below, without separation of the plants from the viscous solution. The mixture was reduced to a paste by milling in a hammermill, cooked at 95°–100° C. and the extractive recovered by filtration, coagulation in isopropyl alcohol and drying. The dry product, herein referred to as whole sea plant extractive, accounted for 32.8% of the original weight of sea plants used in this 20-kilogram aliquot.

The remaining 80 kilograms of mixture was separated into two portions as follows: The viscous solution, containing selectively extracted material, was separated from the residual sea plants by screening. The residual sea plants were washed with 50 kilograms of a 0.4% potassium chloride solution for 5 to 10 minutes. The wash solution was drained off, added to the first solution and the combined solution filtered. The extractive was recovered from this filtrate by precipitation in isopropyl alcohol and dried. The dry selectively extracted product accounted for 7.8% of the original weight of the sea plants used in the 80-kilogram portion.

Finally the residual sea plants were mixed with water, milled, cooked at 95°–100° C. and the resulting extract TABLE 2.—*Effect of variations in potassium hydroxide and potassium chloride concentrations on quantity and gelling properties of recovered extractives*

| Potassium hydroxide present per liter of extracting solution (moles) | Extraction Temperature (° C.) | | | | | | | | | |
|---|---|---|---|---|---|---|---|---|---|---|
| | 40 | | | | 60 | | | | | |
| | Potassium chloride present per liter of extracting solution (moles) | | | | | | | | | |
| | 0.0 | | 0.11 | | 0.0 | | 0.11 | | 0.22 | |
| | Yield [1] | Gel [2] | Yield [1] | Gel [2] | Yield [1] | Gel [2] | Yield [1] | Gel [2] | Yield [1] | Gel [2] |
| None | 11.2 | 280 | 2.5 | 0 | ---- | 680 | 9.3 | 100 | 5.3 | 10 |
| 0.027 | 5.2 | 53 | ---- | ---- | ---- | 600 | ---- | ---- | ---- | ---- |
| 0.055 | 6.6 | 25 | ---- | ---- | ---- | 402 | ---- | ---- | ---- | ---- |
| 0.11 | 4.2 | 0 | 3.2 | 0 | 14.6 | 355 | 7.3 | 30 | 6.3 | 0 |
| 0.22 | 5.1 | 0 | 3.9 | 0 | 8.4 | 77 | 6.3 | 0 | 5.7 | 10 |

[1] Yield, as percent of original sea plant weight.
[2] Gel, breaking strength measured as described in Example 1.

filtered. The extractive was recovered by precipitation in isopropyl alcohol and dried. The dried product accounted for 22.6% of the original weight of sea plant, used in the 80-kilogram portion.

The data in Table 3 show the properties of the three extractives obtained.

*TABLE 3.—Properties of whole extractive and extractive fractions obtained by version of invention in Example 4*

|  | Viscosity [1] | Water Gel Strength [2] | Milk Pudding Gel Strength [3] |
|---|---|---|---|
| Selectively Extracted Product | 2,275 | [4] | [5] |
| Whole Sea Plant Extractive | 1,671 | 204 | 47 |
| Residual Sea Plant Extractive | 830 | 287 | 81 |

[1] Viscosity in centipoises of 1.00% solution at 25° C.
[2] Force in grams to break a gel consisting of 1% by weight of extractive, 1% potassium chloride and 98% water with an 11 mm. diameter plunger at 25° C.
[3] Force in grams required to depress the gel at 10° C. a distance of 4 mm. with a 26 mm. diameter plunger.
[4] Semi-fluid.
[5] Too soft to measure.

The whole sea plant extractive has properties which are intermediate between those of the selectively extracted product and the residual sea plant extractive. This example demonstrates some of the advantages to be gained from the practice of my invention, since the highly viscous properties of the selectively extracted product can be used in applications where gelling properties would be undersirable whereas the extract from the residual sea plant can be used where enhanced gelling properties or stiffer milk puddings are required.

The milk pudding gel strength referred to in this example is determined in the following way:

One pint (480 grams) of whole homogenized milk is weighed out in a tared 600 ml. beaker and .750 gram of the carrageenan extract to be tested is added and stirred into the milk with moderately strong agitation. The beaker is placed in a boiling water bath and held therein for 30 minutes with continuous stirring. Two crystallizing dishes 70 mm. in diameter and 50 mm. deep are filled to the brim with the hot milk and each dish is covered with an 80 mm. glass plate which is slid on in such a manner as to push off excess milk and foam. The dishes are inverted and cooled to 10° C. in the freezing compartment of a refrigerator and then held at 10° C. in a thermostatically controlled box. At the end of a 2-hour period the dishes are set upright, the glass plates are slid off to expose the gel surface and a spatula is run around the inside of the dish to loosen the gel from the wall. The gel strength is then measured with a standard Bloom gelometer adjusted to have a shot flow rate of 200±5 g. in 5 seconds and 4 mm. penetration and fitted with a plunger of a prescribed diameter. The results for each gel are averaged and recorded as grams milk pudding gel strength.

EXAMPLE 5

A 10-gram portion of air-dried *Gigartina chamissoi* was washed in 500 ml. of water at 20° C. for 30 minutes. The sea plants were drained of wash water and transferred to 200 grams solution containing 1.2% by weight potassium hydroxide. The total weight of the mixture was adjusted to 400 grams with water to bring the potassium hydroxide concentration to approximately 0.6% by weight of the total mixture (0.11 mole per liter). The resulting mixture was held at 25°–28° C. for 24 hours with occasional stirring. The viscous solution which resulted from this treatment was drained from the residual sea plants which, although swollen, still retained their original form. The solution was clarified by filtration and the extractive recovered by precipitation is isopropyl alcohol. The dried precipitate amounted to 15.7% of the weight of the original sea plants. A solution consisting of 2% by weight of this precipitate, 1% potassium chloride and 97% water did not gel at 10° C.

The residual sea plant was cooked in 400 ml. of water at 90° C. for 2 hours to obtain the remaining extractive which was recovered in the same manner as above. The dried precipitate amounted to 32.1% of the weight to the original sea plants. A solution consisting of 2% by weight of this precipitate, 1% potassium chloride and 97% water set to a stiff gel which had a breaking strength of 960 grams, when tested by the procedure described in Example 1.

EXAMPLE 6

A 10-gram portion of *Rhodoglossum affine* was handled is essentially the same manner as described in Example 5. The selectively extracted product, which accounted for 19.0% of the weight of original sea plants, had a gel strength of 18 grams whereas the residual extractive, which accounted for 34% of the weight of the original sea plants, had a gel strength of 174 grams when tested by the procedure described in Example 1.

EXAMPLE 7

A 10-gram portion of *Gigartina canaliculata* was handled in essentially the same manner as described in Example 5. The selectively extracted product, which accounted for 28.1% of the weight of the original sea plants, did not gel when tested as described in Example 1, whereas the residual extractive, which accounted for 13.5% of the weight of original sea plants, set to a firm gel.

EXAMPLE 8

A 10-gram portion of *Gigartina leptorhyncos* was handled in essentially the same manner as described in Example 5. The selectively extracted product, which accounted for 8.0% of the weight of the original sea plants, did not gel when tested as described in Example 1, whereas the residual extractive, which accounted for 34.5% of the weight of the original sea plants, set to a firm gel.

EXAMPLE 9

A 10-gram portion of *Gigartina serrata* was handled in essentially the same manner as described in Example 5. The selectively extracted product, which accounted for 1.4% of the weight of the original sea plants, did not gel when tested as previously described, whereas the residual extractive, which accounted for 21.6% of the weight of the original sea plants, set to a firm gel.

Other examples of seaweed varities that likewise may be utilized in the practice of this invention are *Gigartina stellata, Gigartina radula, Gigartina pistillata* and *Gigartina acicularis.*

EXAMPLE 10

A 17-kilogram portion of air-dried *Chondrus crispus* of Nova Scotia origin was washed three times with 400-liter portions of cold water. A slurry of 850 grams of calcium hydroxide in water was added to the washed sea plants and further water added until the total weight was approximately 340 kilograms, the calcium cation concentration being 0.07 mole per liter. The temperature of the mixture was maintained at 37° C. After 24 hours the liquid portion, which had become very viscous, was drained from the residual sea plants, filtered, precipitated with isopropyl alcohol and dried. The dried product, which accounted for 5.5% of the weight of the original sea plants, had a gel strength of 92 grams when tested by the procedure described in Example 4. A chocolate syrup consisting of water, sugar, Dutch process cocoa, and the selectively extracted hydrocolloid was prepared and observed to be fluid with no appearance of gelation. Addition of this syrup to cold milk gave a chocolate milk in which the cocoa particles remained suspended although the cencentration of the selectively extracted hydrocolloid was less than 300 parts per million of the white milk.

The residual sea plants were mixed with water to a total weight of 373 kilograms, milled, and cooked at 95°–100° C. for 2 hours. The resulting extract was filtered and the extractive was recovered by precipitation in isopropyl alcohol and dried. The dried product, which accounted for 31% of the weight of the original sea plants, had a gel strength of 499 grams when tested by the procedure described in Example 4. A chocolate syrup consisting of water, sugar, Dutch process cocoa, and the residual hydrocolloid was prepared and observed to have an undesirable degree of gel structure. Addition of this syrup to cold milk gave a chocolate milk in which settling of the cocoa particles occurred although the concentration of the residual hydrocolloid was 500 parts per million of the white milk.

This example demonstrates that an extractive substantially enriched in the lambda fraction of carrageenan may be obtained by selective extraction employing a cation other than potassium. Moreover, it illustrates the enhancement in the extractive of a desirable property, namely, the ability to suspend cocoa in cold process chocolate milk, which is more pronounced in the lambda than in the kappa fraction of carrageenan. A further advantage brought out in this example arises from the fact that stabilized cold process chocolate milk is generally prepared by the addition to cold milk of a concentrated syrup made up of water, cocoa, sugar, and a suitable suspending agent, such as carrageenan. To obtain a fluid syrup which will pour readily, it is desirable to use a suspending agent which will not tend to produce gelation in the syrup. Hence an extractive which is high in the lambda component of carrageenan is doubly advantageous for this application in that it combines a high degree of suspending power in the cold-mixed milk system with a low degree of water gelling ability.

EXAMPLE 11

A 40-gram portion of air-dried *Chondrus crispus* of Nova Scotia origin was washed for 1¾ hours in 760 ml. of cold water. The wash water was drained off and replaced by an equal volume of water containing 1.3 grams of potassium hydroxide (0.023 mole per liter) and 1 gram of calcium hydroxide (0.01 mole per liter). After the mixture had been held for 24 hours at 35° C. the resulting viscous solution was separated from the residual sea plants and filtered. The extractive was recovered by precipitation in isopropyl alcohol and dried. The dried product accounted for 4.2% of the weight of the original sea plants. A solution of 1.0% by weight of this material, 1.0% potassium chloride and 98.0% water had no measurable gel strength at 10° C.

EXAMPLE 12

80-gram portions from the same lot of *Chondrus crispus* used in Example 1 were treated in solutions containing various combinations of potassium hydroxide, potassium chloride, sodium hydroxide and sodium chloride. The procedures used were the same as described in Example 1.

Table 4 gives the gel strengths and yields of selectively extracted product obtained with the various electrolyte combinations. Compared to the extraction with no added electrolyte, the extraction in the presence of sodium chloride and sodium hydroxide is partly selective but not nearly as selective as in the presence of potassium chloride or potassium hydroxide. However, at least half of the potassium salt or hydroxide may be replaced by sodium chloride or by sodium hydroxide without any sacrifice in the selectivity of the extraction, as shown by the low gel strengths of the products obtained when a combination of these electrolytes was used. It should also be noted that higher yields of the selected extractive are obtained by use of the hydroxides than by use of the equivalent amount of neutral salt. This was also demonstrated in Example 3.

TABLE 4.—*Comparison of effect of sodium and potassium salts on quantity and gelling properties of recovered extractives*

| Electrolyte added per liter of extracting solution (moles) | | | | Recovered Extractive | |
|---|---|---|---|---|---|
| KCl | KOH | NaCl | NaOH | Gel [1] Strength (grams) | Yield (percent b.w. of sea plant) |
| ------ | ------ | 0.055 | ------ | 85 | 2.5 |
| ------ | ------ | 0.11 | ------ | 18 | 2.1 |
| ------ | ------ | ------ | 0.055 | 325 | 5.1 |
| ------ | ------ | ------ | 0.11 | 240 | 4.3 |
| ------ | ------ | 0.055 | 0.055 | 115 | 3.3 |
| 0.055 | ------ | ------ | ------ | 0 | 1.1 |
| ------ | 0.055 | ------ | ------ | 8 | 4.3 |
| 0.055 | 0.055 | ------ | ------ | 0 | 2.0 |
| ------ | 0.055 | 0.055 | ------ | 0 | 2.7 |
| ------ | 0.055 | ------ | 0.055 | 0 | 2.0 |
| ------ | ------ | ------ | ------ | 970 | 3.9 |

[1] See example 1 for measuring technique.

EXAMPLE 13

The following example shows how selective extraction of the lambda fraction can be obtained from the finished carrageenan extractive powder.

A 300-gram sample of commercial sodium carrageenate manufactured from *Chondrus crispus* was dispersed in 15.0 liters of 2.3% potassium chloride solution (0.3 mole per liter). After 15 minutes of agitation the dispersion was allowed to stand at 20°–25° C. for 48 hours. By this time the mixture had become very thick, and apparently was composed of particles of swollen extractive, suspended in a viscous extract.

The extract was separated from the undissolved particles by filtration with 600 grams of diatomite filter aid in a plate and frame filter. The filter cake was washed in the press with 2.3% potassium chloride solution (0.3 mole per liter) and the washings were added to the extract filtrate.

A total of 15 liters of filtrate and washings was recovered and the extractive contained therein was recovered by coagulation in 2 volumes of isopropyl alcohol. The coagulum when dried weighed 110 grams, which represents 37% of the original extractive used. Analysis for the 3,6-anhydro-D-galactose content of the recovered extractive indicated that the material was 97% pure lambda carrageenan on a moisture-free basis. This material had no gelling properties but was an excellent suspending agent when used for stabilizing cold process chocolate milk drinks.

The residual extractive remaining in the filter cake was recovered by slurrying the cake in water, heating to 85°–95° C. and filtering hot. The filtrate set to a very stiff gel on cooling, indicating that the residual material consisted substantially of kappa carrageenan.

The procedure described in this example is useful for the preparation of small batches of lambda and kappa fractions for laboratory investigation but is not the preferred method for commercial operation because it requires that the extractive be completely processed before fractionation. Extraction directly from the sea plant is more economical.

In the above examples the only salts that I have used are chlorides because these are the cheapest and most readily available. They are also more practical to use when alcohol precipitation is employed to recover the extractive because of their solubility in alcohol-water mixtures. It should be understood, however, that my invention is not limited to the use of chlorides and that other salts, such as sulfates, phosphates, nitrates, carbonates, and acetates may also be used with success.

There are a number of advantages to be gained by the practice of my invention. Whereas the method disclosed in the Canadian Patent No. 561,448 is applicable only to carrageenan sols, the practice of my invention permits extraction directly from the raw material without intermediate steps. Because the temperature at which the kappa portion dissolves is about 10° C. higher than the temperature at which it can be precipitated or gelled, all other conditions being the same, there is an increased range of temperature over which one can work by the process of selective extraction as against selective precipitation.

Furthermore, by means of my process I am able to fractionate carrageenan in the presence of salts and hydroxides of the alkaline earth group comprising calcium, strontium, barium and magnesium; whereas the hitherto disclosed method was restricted to the use of ammonium, potassium, rubidium and cesium salts. The reason for this is that cations of the alkaline earth group are sufficiently reactive to prevent solution of the kappa fraction as required in my process but not reactive enough to precipitate the kappa fraction satisfactorily once it is in solution, as required by the process described in the said Canadian patent.

Separation of the fractions is also simpler when my process is used. The selectively extracted lambda component is very readily separated from the residual sea plant material containing the kappa portion either by draining or screening, which is in contrast to the method disclosed in the Canadian patent where the kappa precipitate is always highly swollen and difficult to separate even in a high speed centrifuge.

By the practice of my invention it is possible to extract the lambda component directly from the sea plant under very mild conditions of temperature. Thereby a lambda fraction may be obtained which is of higher molecular weight than that obtainable by hitherto disclosed techniques wherein the carrageenan must be extracted from the sea plant prior to fractionation into its lambda and kappa components. On the other hand, efficient extraction of the whole carrageenan from the sea plant requires the use of relatively high temperatures which inevitably degrade the lambda component thereof. In general, if the separation of the lambda and kappa components is made by selective extraction from the sea plant each fraction can then be processed separately under conditions which are best suited to handling that particular fraction and most desirable for retaining its useful properties.

A further feature of my invention is the satisfactory separation of the two components at concentrations which are commercially more practical than those described in the Canadian patent. Thus, when a sample of *Chondrus crispus* was fractionated by both methods it yielded approximately 10% lambda carrageenan and 27% of what was essentially kappa carrageenan in either case. However, 35% more water was required per unit weight of material fractionated by the method disclosed in the Canadian patent. When less water was used it was impossible to obtain any fractionation whatsoever by the precipitation method because the large mass of swollen precipitate could not be separated in the centrifuge.

By my technique I am also able to prepare with greater ease substantially purer lambda carrageenan than by the technique described in the Canadian patent because it is much easier to prevent the kappa portion from dissolving than to precipitate it quantitatively once it is in solution. This is substantiated by the fact that by my process I have obtained lambda fractions containing as little as 1.2% 3,6-anhydro-D-galactose by a single extraction, whereas by the method of the Canadian patent the anhydrosugar content could not be reduced below 2.1% even after repeated precipitations. Since the anhydrosugar is a component of kappa carrageenan, the amount present in the lambda fraction is a measure of the effectiveness of the fractionation.

On the other hand, for many commercial applications a very high degree of separation of the lambda and kappa fractions is not necessary or even desirable. In this regard it is possible by the practice of my invention to obtain products with intermediate gelling properties by selecting a combination of temperature and electrolytes which is only partially selective, as illustrated in the foregoing examples, particularly Examples 1, 2 and 3. In this manner a spectrum of products can be obtained which possess combinations of properties ranging from those of the whole extractive of the sea plant to those possessed only by the individual components thereof. Thus the composition and properties of the finished extractives can be controlled to a much greater degree than was previously possible.

Because of the large variation in the proportions of the kappa and lambda components of carrageenan in different sea plants it has heretofore been the commercial practice to select sea plants on the basis of the use to which the end product would be put. Thus, for example, sea plants containing a high proportion of the lambda fraction are selected to make a product satisfactory for suspending cocoa in cold-process chocolate milk. On the other hand, sea plants yielding whole extractives with strong gelling properties are selected for making ice cream stabilizers, custards and milk puddings. In other applications such as stabilization of emulsions and preparation of toothpaste where intermediate gelling properties are required, sea plants having an intermediate composition of kappa and lambda fractions are selected. These limitations imposed by the raw material are reflected in production difficulties since it is not always possible to obtain the proper raw material required for a given end use, some sea plants, for example, being available in insufficient quantities to meet the market demand for their extractives while others may be so costly to obtain as to dictate an unfavorable selling price for their extractives. By the use of my invention it is possible to obtain from the same sea plant products with properties ranging from completely non-gelling to strongly gelling, thus relieving the commercial processor from his previous dependence on sea plant type. Moreover, the sea plants best suited to this use of my invention are those which contain roughly equal amounts of lambda and kappa fractions; this type of sea plant fortunately is also the one available in most plentiful supply.

I claim:

1. A process for treating solid undissolved carrageenan-containing material comprising lambda and kappa components for the selective extraction of said components therefrom, which comprises soaking said carrageenan-containing material in a water solution of a water-soluble compound selected from the group consisting of the water-soluble salts and hydroxides of the cations ammonium, potassium, rubidium, cesium, calcium, barium, strontium and magnesium at a temperature between the approximate limits of 5° and 90° C., the cation concentration at such temperature being within the range effectively equivalent to potassium as defined in the relationship $0 > \log C > 0.03T - 2.77$, wherein $C$ is the potassium ion concentration in moles per liter and $T$ is the temperature of the solution in degrees centigrade and the concentration for any hydroxyl ions in said solution being not more than about 0.2 mole per liter, the lambda component of said carrageenan-containing material under said combined conditions of cation concentration and temperature being rendered substantially more soluble than the kappa component so as to go into solution in substantial amount while the kappa component is selectively prevented from going into solution, and separating the solution containing the dissolved lambda component from the undissolved solid residue containing the undissolved kappa component.

2. A process for the selective extraction of the lambda component from solid undissolved sea plants of the order Gigartinales comprising lambda and kappa carrageenan components, which process comprises soaking said solid undissolved sea plant in a water solution of a water-soluble compound selected from the group consisting of the water-soluble salts and hydroxides of the cations ammonium, potassium, rubidium, cesium, calcium, barium, strontium and magnesium, at a temperature between the approximate limits of 5° and 90° C., the concentration of said cations at said temperature being within the range effectively equivalent to potassium as defined by the relationship $$0 > \log C > 0.03T - 2.77$$

wherein C is the potassium ion concentration in moles per liter and T is the temperature of the solution in degrees centigrade and the concentration of any hydroxyl ions in said solution being not more than about 0.2 mole per liter, the temperature of said solution and the concentration of said cations being effective within said limits to solubilize said lambda component until said lambda component is extracted in substantial amount from said solid undissolved sea plant into said solution, the temperature and the concentration of said cations being effective within said limits to render said kappa component less soluble and to cause it to remain selectively in said sea plant, and separating the solution containing the dissolved lambda component from the residual solid undissolved sea plant containing said kappa component remaining therein.

3. A process for the selective extraction of the lambda component from solid undissolved sea plants of the order Gigartinales comprising lambda and kappa carrageenan components, which process comprises soaking said solid undissolved sea plant in a water solution of a water-soluble compound selected from the group consisting of the water-soluble salts and hydroxides of the cations ammonium, potassium, rubidium, cesium, calcium, barium, strontium and magnesium, said solution containing a water-soluble hydroxide providing hydroxyl ions at a concentration within the range from about 0.025 to about 0.2 mole per liter, at a temperature between the approximate limits of 5° and 90° C., and the concentration of said cations at said temperature is within the range effectively equivalent to potassium as defined by the relationship $0 > \log C > 0.035 - 2.77$ wherein C is the potassium ion concentration in moles per liter and T is the temperature of the solution in degrees centigrade, the temperature of said solution and the concentration of said cations in said solution being effective within said limits to solubilize said lambda component until said lambda component is extracted in substantial amount from said solid undissolved sea plant into said solution, the temperature and concentration of said cations being effective within said limits to render said kappa component less soluble and to cause it to remain selectively in said sea plant, and the hydroxyl ions being effective to substantially swell said sea plant and thereby facilitate diffusion of dissolved lambda component into said solution, and separating said solution containing said dissolved lambda component from the residual solid undissolved sea plant containing said kappa component remaining therein.

4. A process for the selective extraction of the lambda component from solid undissolved sea plants of the order Gigartinales comprising lambda and kappa carrageenan components, which process comprises soaking said solid undissolved sea plant in a water solution containing a water soluble compound selected from the group consisting of potassium hydroxide and the water-soluble salts of potassium at a temperature between the approximate limits of 5° and 90° C. and containing potassium ions at a concentration within the range defined by the relationship $0 > \log C > 0.03T - 2.77$ wherein C is the potassium ion concentration in moles per liter and T is the temperature of the solution in degrees centigrade, the concentration of any hydroxyl ions in said solution being not more than about 0.2 mole per liter and the temperature of said solution and the concentration of said potassium ions in said solution being effective within said limits to solubilize said lambda component until said lambda component is extracted in substantial amount from said solid undissolved sea plant into said solution, the temperature and the concentration of said cations being effective within said limits to render said kappa component less soluble and to cause it to remain selectively in said sea plant, and separating the solution containing the dissolved lambda component from the residual solid undissolved sea plant containing said kappa component remaining therein.

5. A process as in claim 4 wherein said potassium ions are supplied essentially by potassium hydroxide.

6. A process as in claim 4 wherein said potassium ions are supplied essentially by potassium chloride.

7. A process according to claim 4 wherein said potassium ions are supplied essentially by a mixture of potassium hydroxide and a soluble potassium salt.

8. A process for the selective extraction of the lambda component from solid undissolved sea plants of the order Gigartinales comprising lambda and kappa carrageenan components, which process comprises soaking said solid undissolved sea plant in a water solution containing a water-soluble compound selected from the group consisting of potassium hydroxide and the water-soluble salts of potassium, at a temperature between the approximate limits of 5° and 90° C., said solution containing a water-soluble hydroxide providing hydroxyl ions at a concentration within the range of 0.025 to 0.2 mole per liter and containing potassium ions at a concentration within the range defined by the relationship $0 > \log C > 0.03T - 2.77$ wherein C is the potassium ion concentration in moles per liter and T is the temperature of the solution in degrees centigrade, the temperature of said solution and the concentration of said potassium ions in said solution being effective within said limits to solubilize said lambda component until said lambda component is extracted in substantial amount from said solid undissolved sea plant into said solution, the temperature and the concentration of said potassium ions being effective within said limits to render said kappa component less soluble and to cause it to remain selectively in said sea plant, and the hydroxyl ions being effective to substantially swell said sea plant and thereby facilitate diffusion of dissolved lambda component into said solution, and separating said solution containing said dissolved lambda component from the residual solid undissolved sea plant containing said kappa component remaining therein.

9. A process as in claim 8 wherein said potassium ion concentration and said hydroxyl ion concentration are supplied essentially by potassium hydroxide.

10. A process as in claim 8 wherein said potassium ion concentration is supplied essentially by a water-soluble salt of potassium and the hydroxyl ion concentration is supplied by sodium hydroxide.

11. A process as in claim 8 wherein said potassium ion concentration is supplied essentially by a water-soluble salt of potassium and said hydroxyl ion concentration is supplied by calcium hydroxide.

12. A process as in claim 8 wherein said potassium ion concentration and said hydroxyl ion concentration are supplied by a mixture of potassium hydroxide and calcium hydroxide.

13. A process as in claim 3 wherein the selective extraction is effected in a water solution containing calcium hydroxide which supplies an hydroxyl ion concentration within the range 0.025 to 0.2 mole per liter.

14. A process as in claim 2 wherein the sea plant is selected from the group consisting of *Chondrus crispus, Rhodoglossum affine, Gigartina chamissoi, Gigartina canaliculata, Gigartina leptorhyncos, Gigartina serrata, Gigartina stellata, Gigartina radula, Gigartina pistillata, Gigartina acicularis.*

15. A process as in claim 8 wherein the sea plant is selected from the group consisting of *Chondrus crispus, Rhodoglossum affine, Gigartina chamissoi, Gigartina canaliculata, Gigartina leptorhyncos, Gigartina serrata, Gigar-*

*tina stellata, Gigartina radula, Gigartina pistillata, Gigartina acicularis.*

References Cited by the Examiner
UNITED STATES PATENTS

| | | | |
|---|---|---|---|
| 2,073,616 | 3/37 | Acree | 260—209 |
| 2,620,335 | 12/52 | Nielsen et al. | 260—209 |
| 3,094,517 | 6/63 | Stanley | 260—209 |

FOREIGN PATENTS

| | | |
|---|---|---|
| 479,034 | 12/51 | Canada. |
| 561,448 | 8/58 | Canada. |

CHARLES B. PARKER, *Primary Examiner.*

ABRAHAM H. WINKELSTEIN, T. E. LEVOW,
*Examiners.*